UNITED STATES PATENT OFFICE.

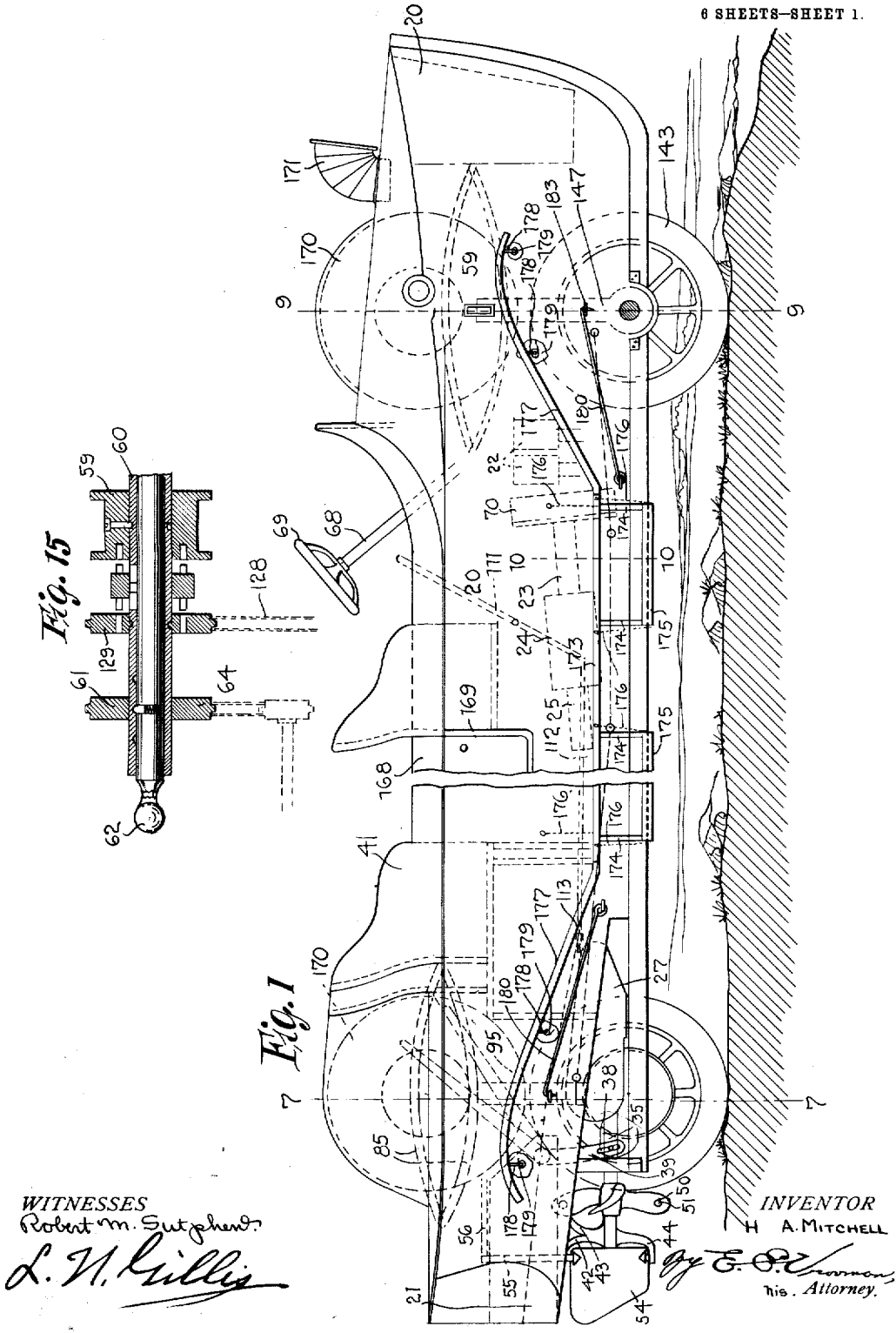

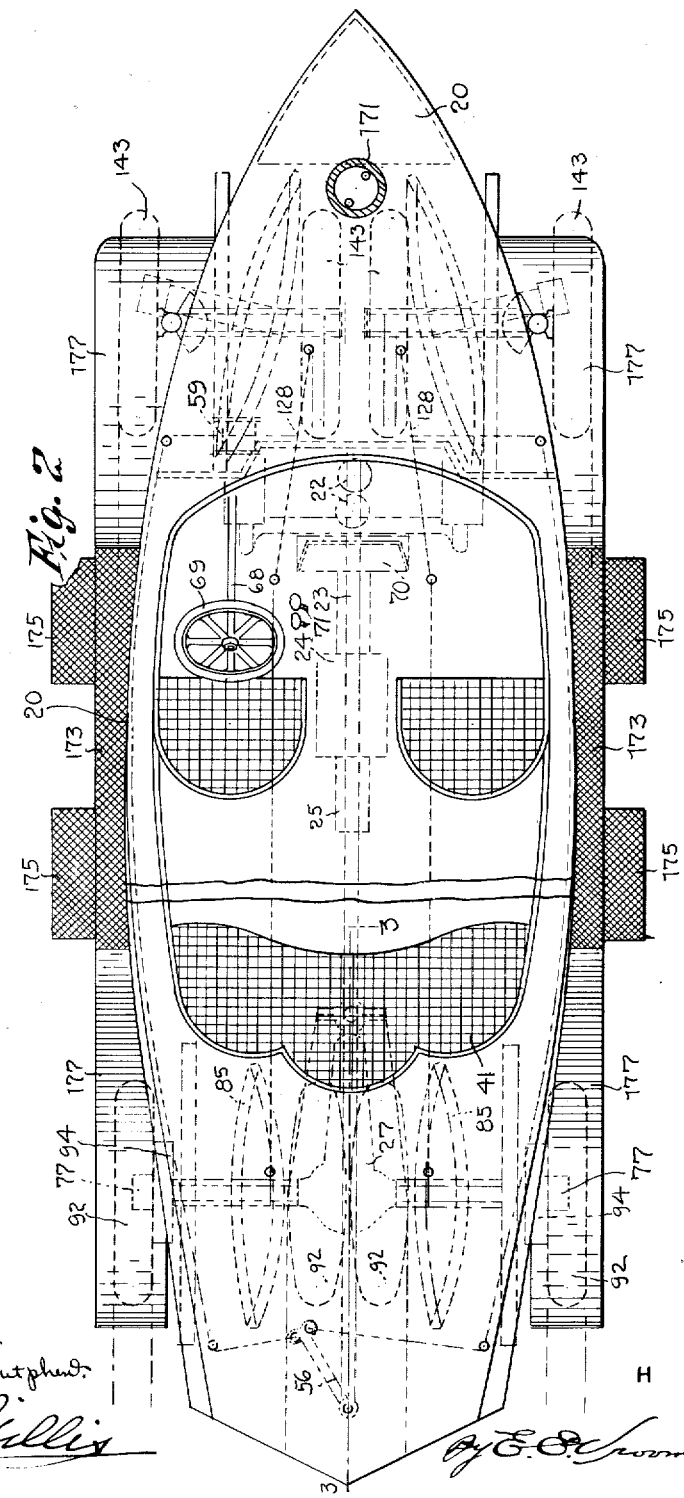

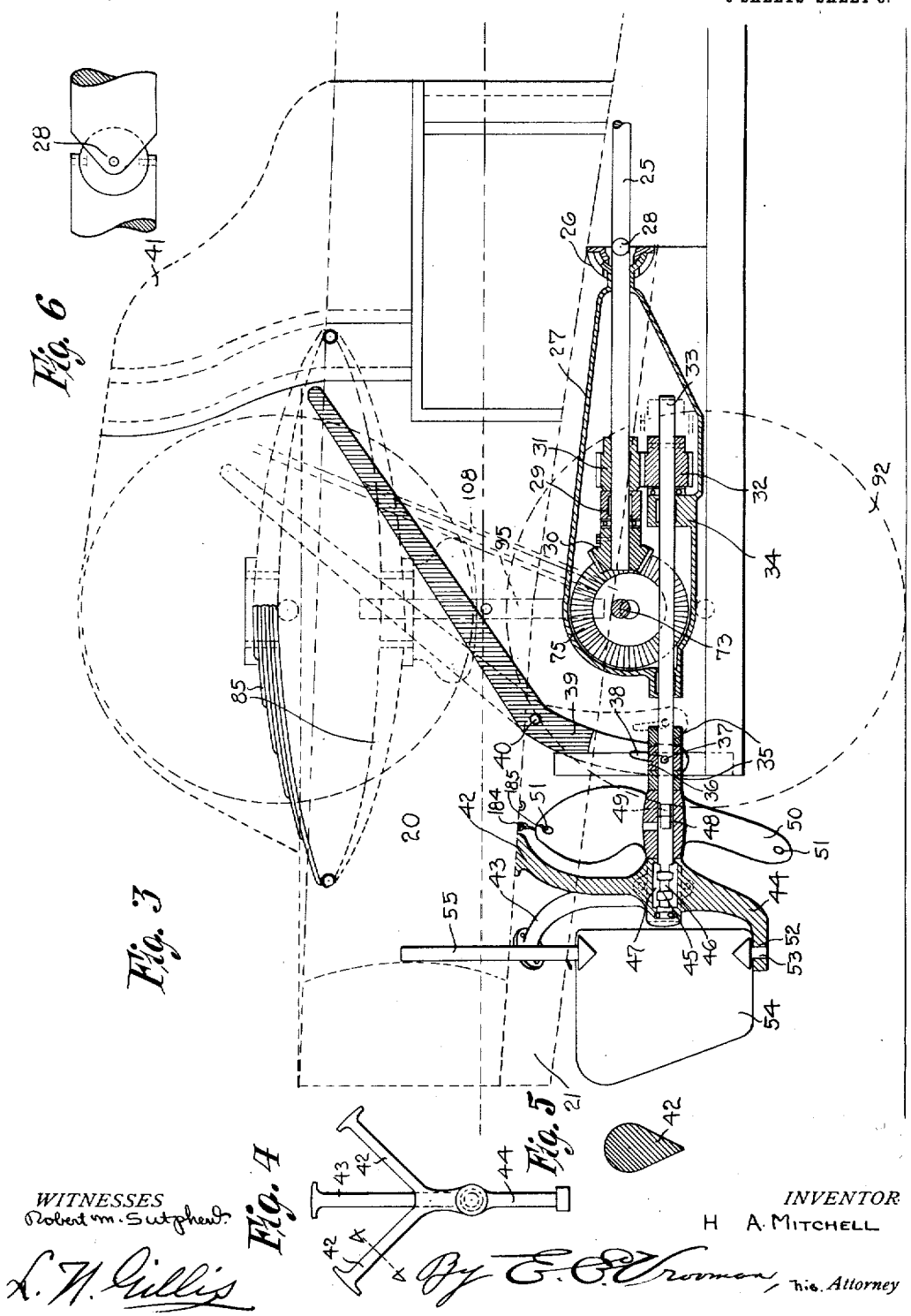

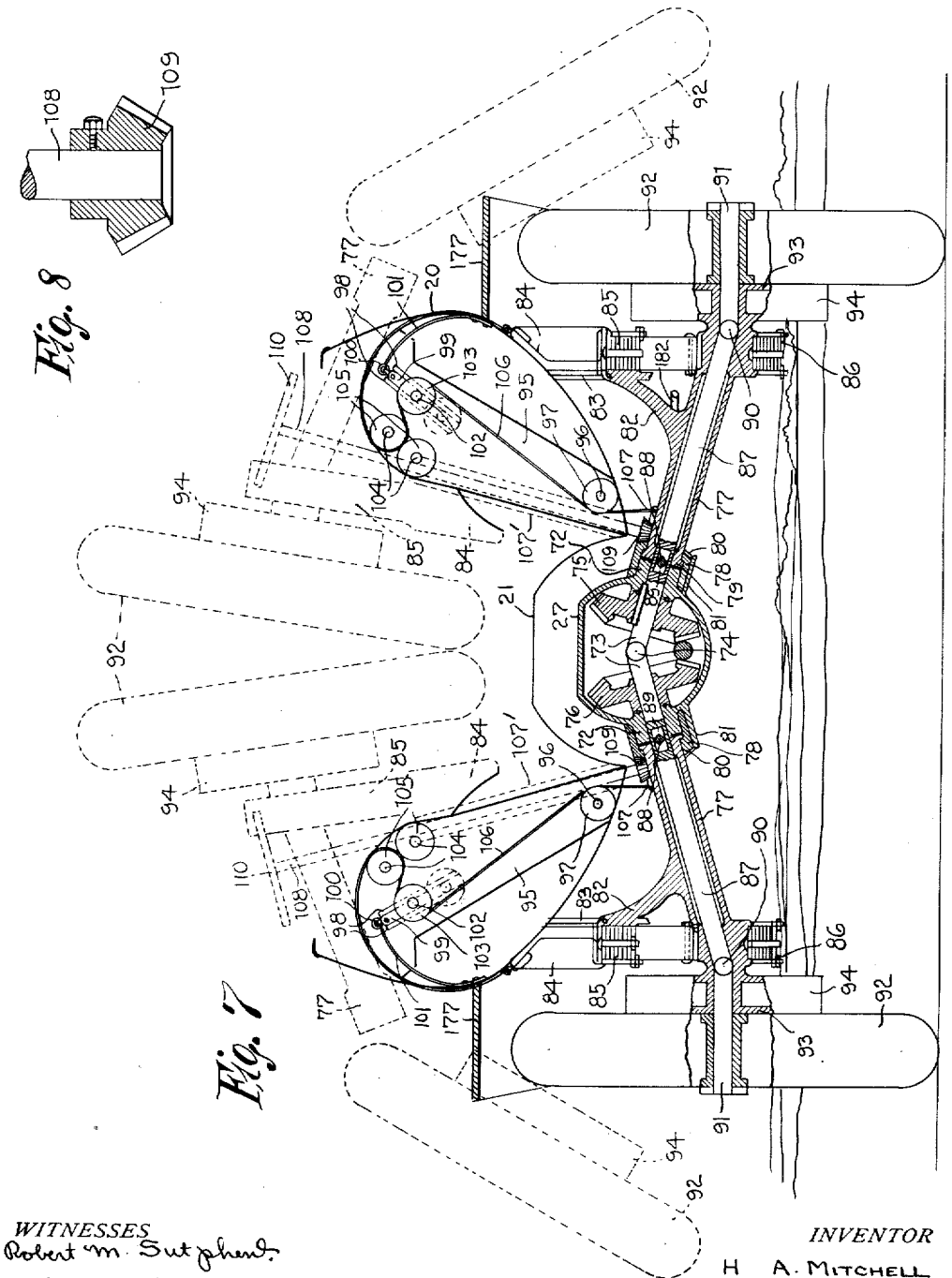

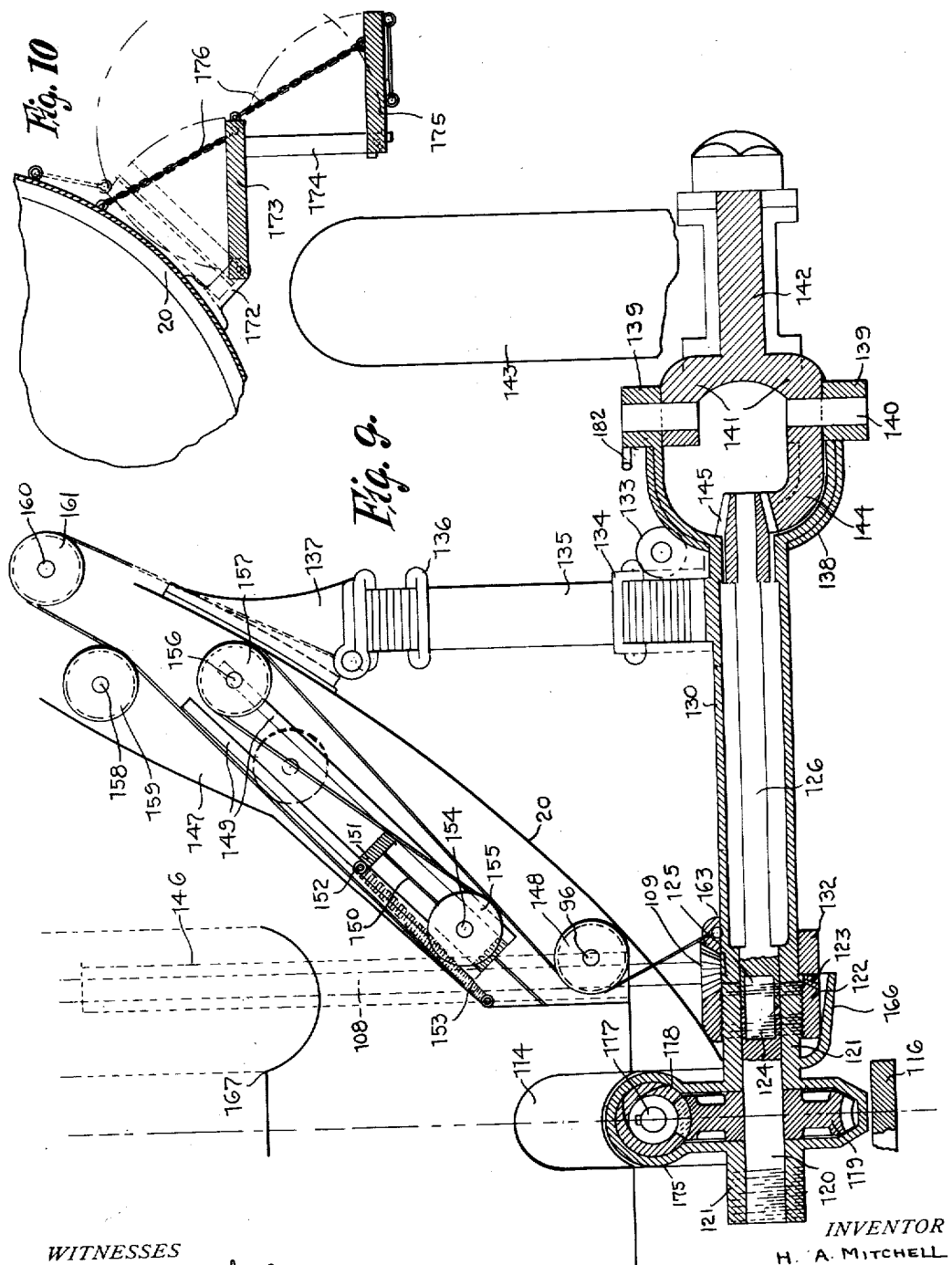

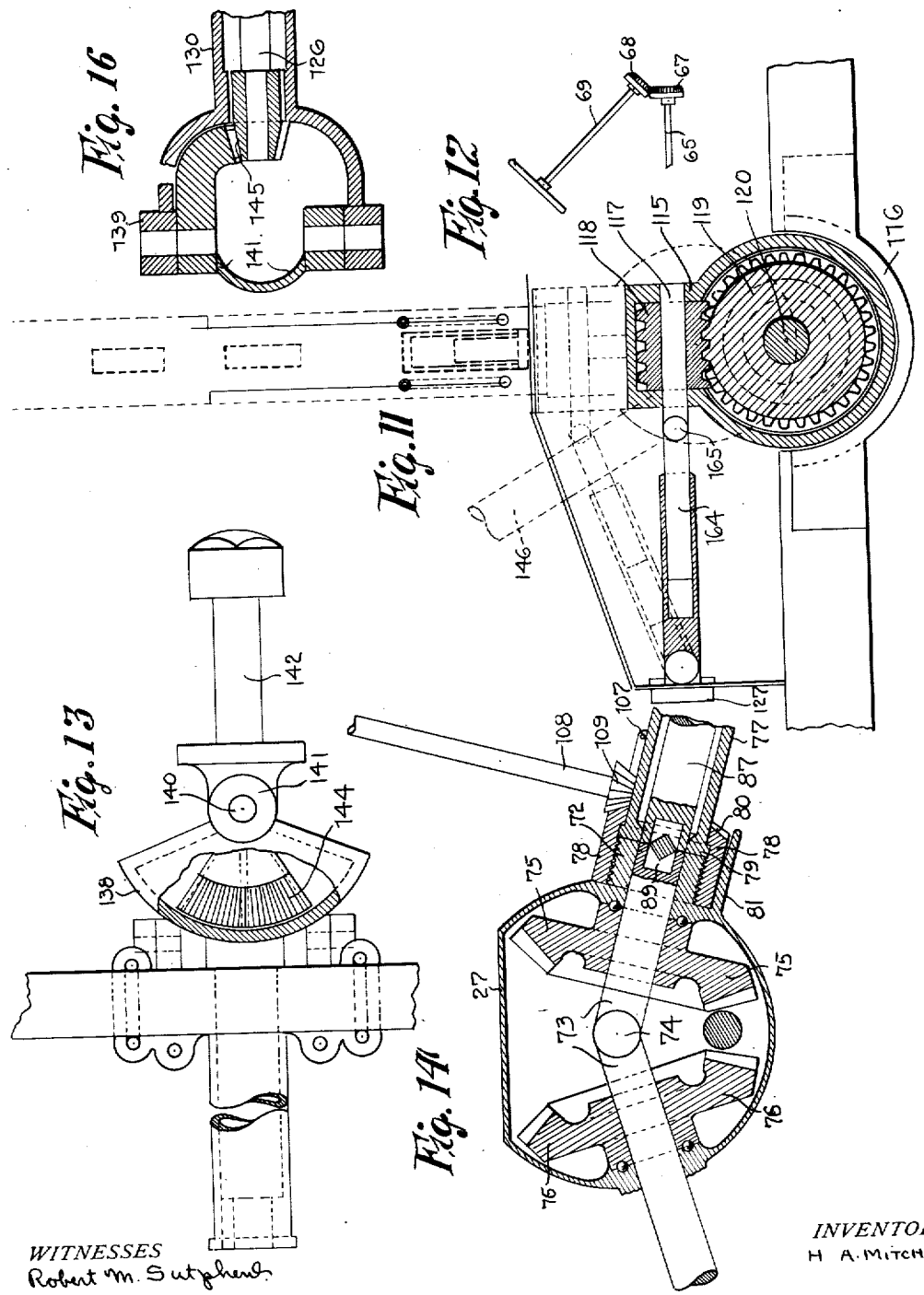

HARTLEY A. MITCHELL, OF NEWPORT NEWS, VIRGINIA.

CONVERTIBLE MOTOR-BOAT AND AUTOMOBILE COMBINED.

1,047,271. Specification of Letters Patent. Patented Dec. 17, 1912.

Application filed November 13, 1911. Serial No. 660,067.

*To all whom it may concern:*

Be it known that I, HARTLEY A. MITCHELL, a citizen of the United States, residing at Newport News, in the county of Warwick and State of Virginia, have invented certain new and useful Improvements in Convertible Motor-Boats and Automobiles Combined, of which the following is a specification, reference being had therein to the accompanying drawing.

This invention relates to motor driven vehicles and has special reference to a vehicle of the class described that can be used either as an automobile or motor boat, being convertible from one to the other upon short notice.

The principal object of the invention is to provide a vehicle having detachable wheels and a water tight body with interior spaces for the wheels and axles.

The invention further has for its object to provide means for detaching the wheels and lifting them into the body after the vehicle has been run into the water, the detachment and lifting of the wheels being controlled from within the body of the vehicle.

A third object of the invention is to provide a novel form of drive which may be shifted either to a propeller or to the driving wheels and their axles.

A fourth object of the invention is to provide novel means for steering the vehicle when in use as an automobile.

A fifth object of the invention is to provide an improved arrangement of running board and guards.

With the above and other objects in view as will be hereinafter apparent, the invention consists in general of certain novel features of construction, combinations of parts and arrangements of details hereinafter fully described, illustrated in the accompanying drawings, and specifically set forth in the claims.

In the accompanying drawings, like characters of reference indicate like parts in the several views, and Figure 1 is a side elevation of a device constructed in accordance with this invention. Fig. 2 is a plan view thereof. Fig. 3 is an enlarged detail section on the line 3—3 of Fig. 2. Fig. 4 is a detail view of a certain bracket used as a support for the out board-end of the propeller shaft and rudder. Fig. 5 is a section on the line 4—4 of Fig. 4. Fig. 6 is a view of a type of universal joint used in connection with certain portions of this invention. Fig. 7 is a section on the line 7—7 of Fig. 1, different positions of the wheels being shown in dotted lines. Fig. 8 is a detail view of a certain gear employed in connection with this invention to release the wheels from their drive mechanism. Fig. 9 is a section on the line 9—9 of Fig. 1. Fig. 10 is a section on the line 10—10 of Fig. 1. Fig. 11 is a detail section partly diagrammatic showing the steering gear, the section being taken at right angles to Fig. 9. Fig. 12 is another detail of a portion of the steering gear. Fig. 13 is a plan view of certain parts of the mechanism shown in Figs. 11 and 12. Fig. 14 is an enlarged detail section of a portion of the mechanism shown in Fig. 7. Fig. 15 is a detail view showing the steering or tiller rope drum and other portions of the steering gear. Fig. 16 is a detail view showing one of the knuckle joints used in connection with the steering mechanism.

This invention is provided with a body 20 which is preferably of boat shape and of that type which is characterized by having a concaved stern and is commonly called tunnel sterned, the concavity of the stern being indicated at 21. Within this body there is provided an ordinary engine which may be of any preferred type such as is commonly used in automobiles or power boats, the specific type of engine forming no particular part of the present invention. This engine is diagrammatically indicated at 22 and is provided with the usual shaft 23 which extends to a set of speed changing gears carried in the usual casing 24, these speed changing gears are only indicated by the outline of the casing in the present drawing as the type of gearing is well-known and forms no specific part of the present invention. From this gear set extends a shaft 25 which passes out through the bottom of the boat it being led through a water tight packing in the form of a universal joint 26 which forms one end of a gear casing 27. The shaft is also jointed centrally on this universal joint as indicated at 28 so that the tail end of this shaft may have movement with respect to the forward end thereof as the gear casing moves about the support formed by the universal joint at its end.

The tail end of this shaft is supported in a bearing 29 within the gear casing and carries on its extremity a beveled gear 30. Upon the opposite side of the bearing 29 there is provided a spur gear 31 which meshes with a gear 32 which is carried on a shaft 33 which forms the tail shaft. This shaft 33 is slidable longitudinally of the bearings 34 wherein it is journaled so that by movement longitudinally of the shaft the gear 32 may be moved into and out of mesh with the gear 31. On the shaft 33 are spaced collars 35 between which is a loose collar 36 having pins 37 projecting laterally therefrom which are engaged in slots 38 formed in the forked end of a lever 39 which is pivoted to the body of the vehicle as at 40, the handle end of the lever extending upward to a position convenient to the person occupying the rear seat 41 of the vehicle. Secured in the tunnel 21 is a bearing bracket consisting of a forwardly extending leg 42 and lateral legs 43 so arranged that they may be attached in the form of an inverted tripod. This bracket also has a downwardly and rearwardly extending rudder strut 44. Journaled in the bracket 42 is a short section of shaft 45 having grooves 46 formed therearound which are engaged by rings in a tubular boxing 47 so that motion endwise of the shaft is prevented. This short shaft 45 is in alinement with the shaft 33, and the forward end thereof is provided with a socket 48 for the reception of a pin 49 carried by the shaft 33. The socket and pin are so formed that when the shaft 33 revolves the shaft 45 will also revolve provided the pin is within the socket. Keyed upon the shaft 45 is a propeller 50 which preferably has three blades, each of which is provided with an opening 51 near its tip. The shaft 33 is slidable into and out of the hub of said propeller so that the pin 49 can be caused to enter the socket 48 by the proper manipulation of the lever 39, it being obvious that when the pin is in its socket the gears 31 and 32 will be in mesh.

From the foreging it will be noted that the power of the engine may be transmitted to the propeller 50 through the medium of the shaft and the gears 31 and 32.

The rudder strut 44 is provided with a suitable gudgeon 52 for the reception of the bottom pintle 53 of a rudder 54 which has a rudder post 55 extending upward from a suitable bearing. On the upper end of this rudder post there is provided a tiller arm 56, to the forward end of which are attached tiller ropes 57 which are led over suitable guide sheaves 58 and are wound upon a drum 59 carried upon a shaft 60. This shaft 60 also carries a sprocket 61 which may be clutched thereto by an ordinary clutch operated by a clutch knob 62. The sprocket 61 is connected with a sprocket 63 by means of a link belt 64 the sprocket 63 being carried on a short shaft 65 whereon is also mounted a beveled gear 66 which meshes with a beveled gear 67 fixed upon a steering post 68 which is provided with the ordinary form of steering wheel 69.

The portion of the apparatus just described is that which is used in the operation of the device when the same is being utilized as a motor boat it being understood that the usual fly wheel clutch 70 forms part of the engine equipment, the latter being operated by a suitable clutch pedal 71.

Extending laterally from the gear casing 27 are short tube sections 72 which are threaded exteriorly. Journaled in these tube sections 72 are shaft sections 73 which are connected at their inner ends within the gear casing by means of a ball or other universal joint 74. Keyed upon one of the sections 73 is a beveled gear 75 while upon the other section is mounted an idler beveled gear 76. These gears 75 and 76 mesh with the gear 30 on the shaft 25. Extending outward from the tube sections 72 are tubular axle casings 77 which are connected to the respective tubes 72 by means of unions consisting of a nut 78 and flange 79 formed upon the tube 77. The nut 78 has its outboard end provided with teeth to form a beveled gear 80 and is guided into position on the threaded portion of the tube 72 by a nut guide spout 81 formed on the gear casing 27. Each tube 77 is provided at its outer end with an upwardly extending arm 82 which works in a guide way 83 formed on a spring bracket 84. Secured to the spring bracket 84 is the upper half of an elliptical spring 85, the lower half thereof being secured by means of a spring clip 86 to the enlarged outer end of the tube 77. Extending through each of the tubes 77 is an axle section 87 which is connected at its inner end to the respective shaft sections 73 by means of a square pin 88 which fits within a socket 89 formed in said sections 73. The out-board end of each axle 87 is connected by means of a ball and socket joint 90 with a stub axle 91 whereon is mounted a wheel 92 of the ordinary automobile type. The wheels 92 are each provided with a suitable brake drum 93 surrounded by the ordinary brake band 94.

Immediately above the position of the tubes 77 the body of the vehicle is provided with oppositely disposed pockets 95. At the lower end of each of the pockets 95 there is provided a shaft 96 whereon is mounted a sprocket 97. At the upper end of each of the pockets are guide strips 98 arranged in pairs on the forward and after walls of the pockets and between these guide strips there is slidably mounted a pair of bearing members 99 which are connected by a link 100 at their upper ends, the latter being in turn connected with the free end of a tightener spring 101 so that there is a constant tendency to pull the members 99 upward. Journaled in these bearings is a shaft 102 whereon is mounted a sprocket 103. Within the pockets 95 are also other shafts 104 whereon are sprockets 105. The shafts 96 run in each of the pockets and extend entirely therethrough as will be explained hereinafter.

The shafts 96 are the operating shafts for the sprockets which have just been described. Extending around these sprockets is a chain belt 106 which has one end connected to an eye 107 formed on the tube section 77, while its remaining end is connected to the spring bracket 84,—the belt being at all times kept tight by means of the effect of the spring 101.

When the device is in use as an automobile each chain belt 106 extends down almost perpendicularly from the inboard side of the sprocket 97. From the sprocket 97 it extends upwardly to the outboard side of the sprocket 103, and around the top thereof, beneath one of the sprockets 105, and around this sprocket down the vehicle body to its point of connection with the spring bracket. If now the shaft 96 on one side be rotated after the nut 78 is unscrewed, the chain will be caused to pass over the sprockets. If the direction of rotation is such as to pull upon the spring bracket 84 the other end of the chain will be slacked off so that the spring bracket axle tube and all attached parts will be raised up until the wheel is turned inboard as indicated in dotted lines in Fig. 7. At this time the chain belt 106 will engage the upper side of the lower sprocket 105, thus permitting the spring bracket and attached parts to be lowered into the vehicle body.

Extending upward from a point adjacent the nut 78 there is provided a gear wrench tube 107' through which is adapted to pass a gear wrench in the form of a rod 108 provided at its lower end with a beveled gear 109 and at its upper end with a suitable handle 110. This beveled gear 109 is adapted to mesh with the gear teeth 80 of the nuts 78 so that by putting this gear wrench through the tube 107 and rotating the same the nut 78 may be rotated thus unscrewing or screwing on the respective tube 72.

It will be obvious that by reversing the direction of movement of the driving shaft 104 the parts will be brought from inboard out around the side and the inboard end of the tube 77 will be brought in contact with the respective tube 72 so that by operating the gear wrench connection may be made between the two, the guide spout 81 serving to bring them in proper alinement.

Situated adjacent the forward end of the vehicle body is the usual brake lever 111 which is connected by means of brake rods 112 which pass through water tight joints 113 and are connected to the brake bands 94. These rods are disconnected by hand when it is desired to use the device as a boat and are drawn into the body of the vehicle.

Located on the midship line of the forward end of the vehicle body is a pocket 114 which contains a hollow gear casing 115, the lower part of which extends outward beneath the vehicle body and is protected by means of a guard 116.

The shaft 117 extends into the worm gear casing 115 and on this shaft is a worm 118 which meshes with a worm gear 119 carried on the shaft 120 which is journaled in a pair of tubular bearings 121 which extend from the casing 115. The outer ends of these bearings 121 are each threaded to receive a nut 122 which has its outer end provided with teeth to constitute a beveled gear 123. The shaft 120 is provided at each end with a square or other angular socket 124 wherein fits a pin 125 which extends from a shaft section 126. The shaft 117 is provided with a sprocket 127 which is connected by means of a chain 128 with a sprocket 129 carried on the shaft 60. Surrounding the shaft 126 is a tube 130 which constitutes the front axle at each side of the vehicle. This tube has at its inner end a collar 131 and adjacent this is a second collar 132 between which and the collar 131 the nut 122 is held. On the outer end of this tube there is provided a hinge knuckle 133 whereto is hinged a spring clip 134 carrying a spring 135, the upper part of which is connected by means of a clip 136 with a spring bracket 137. Outside of the knuckle 133 the tube is forked and has a gear casing 138, the outer end of which is provided with a pair of vertically alined bearings 139 for the reception of pins 140 carried on the ends of arms 141 formed on a front wheel hub 142 carrying the usual front wheel 143. Extending from the lower arm 141 is a segmental beveled gear 144 wherewith meshes a beveled gear 145 carried on the outer end of the shaft 126. Now it will be plain that by rotating the steering wheel the shaft 117 will be caused to rotate and this in turn will operate to move the steering or front wheels 143 through the medium of the worm, worm wheel, and beveled gears 144 and 145.

It will be observed that while one of the members 142 has the segmental gear 144 on its lower arm the other member must have said segmental gear on its upper arm so as not to cause the steering wheels to take opposite positions.

Adjacent each of the nuts 122, when the device is not in use as a boat, there is provided a gear wrench tube 146 adapted for the reception of the gear wrench previously described.

Immediately above each of the tubes 130 the body of the vehicle is provided with a pocket 147 through which pass the shafts 96. These shafts 96 each carry a sprocket 148. Within each of the pockets there are provided tightener sprocket guides 149 wherein slide bearing members 150 connected by a yoke 151 provided with an eye 152 to which is fastened one end of a coil spring 153, the other end being fastened in any suitable manner to the vehicle body. The tendency of these springs is to constantly urge the slides and yoke downward. Journaled in these slides is a shaft 154 whereon is mounted a sprocket 155. At the upper part of the pocket there is provided a shaft 156 which carries a sprocket 157 and a shaft 158 carrying a sprocket 159, and a shaft 160 which carries a sprocket 161, the latter extending out to project beyond the side of the vehicle body.

Attached to the spring bracket 137 is one end of a link belt 162 which runs from the spring bracket over the sprocket 161, outside of the sprocket 159, around the sprocket 155 back of a sprocket 157, then down and over the sprocket 148, and is connected to an eye 163 formed on the inner end of the respective tube 130. Now it will be plain that by properly operating the gear wrench the front wheels may be set free from the bearing tubes 121 and by then turning the shaft 96 in the proper direction the front wheels may be lifted up in like manner to the rear wheels, the spring being permitted to fold into position, shown in dotted lines, by means of the hinge 133.

It is to be observed that in order to permit the action of the springs 135 the shaft 117 is provided with a sliding joint at 164 and also with a ball and socket or other universal joint 165.

In order to guide the nuts 122 properly to their position, guide spouts 166 are provided on the underside of the tubes 121.

It will be noted that the shafts 96 may be operated either by hand or by means of suitable gearing connected with the power plant of the device as may be desired. Within the body of the vehicle there are provided wheel rests 167 for the reception of the wheels in their inboard position.

The body of the vehicle is, of course, provided with the usual doors 168 but it is to be specifically noted that these doors in this instance have gaskets 169 for the purpose of keeping water out of the body when the device is in use as a motor boat.

At the front of the vehicle there are provided suitable housings 170 for the wheels while a similar housing is used at the rear for the rear wheels. In order to keep the engine ventilated a ventilator 171 is mounted on what may be termed the forward deck of the vehicle.

Secured to suitable brackets 172 are steps 173 which have pivoted thereto arms 174 which in turn carry steps 175. The steps 173 and 175 are held in proper horizontal position when in use by means of chains 176.

Extending from each end of the respective step 173 there is a running board 177 which is supported by brackets 178 entering sockets 179 in the side of the vehicle body. In order to brace the outer portions of the axles and prevent stress on the sprocket chains, rods 180 are provided, which have one end secured in a suitable eye 181 and its other end removably held in an eye 182 formed on the respective axle tube. There is also provided a set of eyes 183 for the reception of these rod ends when the device is in use as a boat. Beneath the tunnel is a short chain 184 which carries at its end a hook 185 which is adapted to enter one of the openings formed in the propeller for the purpose of preventing the rotation of the propeller while traveling along a road. By reason of having the propeller three bladed, two of the blades will project downward at angles of 60° when the third is vertical so that they will not come as close to the ground when the device is in use as an automobile as would be the case with a four bladed propeller.

Attention is called to the fact that the supporting members 42, 43, and 44 are all of oval cross section with sharply pointed forward ends for the purpose of spreading water and reducing resistance when moving through the water.

In the operation of the device let it be supposed that the same is in use as an automobile:—Upon arriving at the shore of a body of water the operator removes the wheel guards, places them in the automobile, disengages the brake rods and slips them in their proper openings, hooks up the steps and unhooks the braces and drops their free ends into their keeper loops. He then starts his machine and runs the same into the water until it floats. He operates the gear wrench to unscrew all of the nuts which engage the axles with the fixed parts. Then he operates the shaft 96 and brings the wheels inboard. After this he operates the lever 39 so as to bring the gears 31 and 32 into mesh. It should be noted that the propeller is, of course, unhooked preparatory to going in the water. He then has the boat in condition for use on the water. When he again desires to go on the land he simply reverses the operation, bringing the boat close enough to the shore so that but little movement will be required to get the wheels bearing on the bottom.

It is obvious that many minor changes may be made in the form and construction of this invention without departing from the material principles thereof.

It is not therefore desired to confine the invention to the exact form herein shown and described but it is wished to include all such as properly come within the scope of the appended claims.

Having thus described my invention, what is claimed as new is:—

1. An automobile boat having detachable wheels, detaching means operable from within the boat, and hoisting means operable after detachment of the wheels for raising said wheels into the boat.

2. An automobile boat having detachable wheels, detaching means operable from within the boat, and hoisting means arranged to automatically reverse the position of said wheels while simultaneously lifting them into said boat.

3. An automobile boat having wheels carried on detachable axle sections, detaching means for said sections operable from within the boat, and hoisting and lowering means for raising said wheels and axle sections into the boat.

4. An automobile boat having detachable wheels and axle sections, detaching means operable from within the boat, and hoisting and lowering means arranged to automatically elevate the wheels and axle sections and turn them end for end and to automatically reverse the movement and restore them to their initial position.

5. An automobile boat having detachable wheels, axle sections and springs, detaching means operable from within the boat, and hoisting means for simultaneously raising each wheel with its axle section and spring and placing the same within the boat.

6. An automobile boat having wheels carried on detachable axle sections, spring brackets pivoted to said axles, springs attached to said brackets, other spring brackets attached to said springs and bearing beneath the body of said boat, detaching means for the axle sections operable from within the boat, and hoisting means for raising said wheels, and sections and springs and placing them within the boat.

7. An automobile having wheels carried on detachable axle sections, spring brackets pivoted to said axles, springs attached to said brackets, other spring brackets attached to said springs and bearing beneath the body of said boat, detaching means for the axle sections operable from within the boat, hoisting means for raising said wheels, axle sections and springs and placing them within the boat, and guide means within said boat for moving said spring to an acute angle with its respective axle section.

8. An automobile boat having detachable axle sections, wheels carried by said sections, spring brackets attached to said sections, springs carried by said brackets, other spring brackets attached to said springs and normally bearing beneath the boat, tension organs each having one end connected to a respective one of the last mentioned spring brackets and its other end connected to the inner end of a respective shaft section, guide pulleys over which said tension arms are trained, and a drive pulley for each of said tension organs.

9. An automobile boat having detachable axle sections, wheels carried by said sections, spring brackets attached to said sections, springs carried by said brackets, other spring brackets attached to said springs and normally bearing beneath the boat, tension organs each having one end connected to a respective one of the last mentioned spring brackets and its other end connected to the inner end of a respective shaft section, guide pulleys over which said tension organs are trained, a drive pulley for each of said tension organs, and means to maintain the tension throughout said tension organs.

10. An automobile boat having a body provided with lateral pockets, detachable axle sections, wheels carried by said axle sections, springs supporting said axle sections, detaching means for said sections operable from within the boat and hoisting means for raising said wheels, spring and axle sections located in said pockets.

11. An automobile boat having detachable front and rear pairs of wheels, detaching means operable from within the boat, and means operable after detachment of the wheels to simultaneously hoist the wheels on a side of said boat and place them within the boat.

12. In an automobile boat, driving wheels, a propeller, a stub shaft carrying said propeller, a power plant including the driving shaft, a third shaft slidable longitudinally into and out of engagement with said stub shaft and connected therewith by a pin and socket connection, a gear on the driving shaft, a second gear on the third shaft and movable therewith whereby it is slid into and out of mesh with the teeth of the first mentioned gear, a lever for moving said third shaft, and other means to connect the driving shaft and driving wheels.

13. In an automobile boat, a rudder, steering wheels, a steering post, and means to selectively connect the steering post with the wheels and rudder.

14. In an automobile boat, a rudder, steering wheels, a steering post, a shaft operably connected with said steering post, a gear train connecting said steering wheels with said shaft and including a gear loosely mounted on the shaft, a winding drum, a tiller for said rudder, a tension organ connecting said drum and tiller, said drum being revolubly mounted on said shaft, and clutch means held to revolve with said shaft and adapted to connect the gear thereof and the drum selectively to the shaft to rotate therewith.

15. In an auomobile boat, a driving axle including a centrally disposed portion and lateral extensions therefrom, said extensions being held to rotate in union with the central portion by a pin and socket connection, and releasable means to hold the extensions and central portion together.

16. In an automobile boat, a gear casing, tubular extensions projecting laterally therefrom and having threaded ends, shaft casings having unions at their inner ends adapted to screw on the tubular extensions, a driving axle including a centrally disposed portion mounted in said gear casing and lateral extensions in said shaft casing, said extensions being held to rotate in unison with the central portion, and means operable from within the boat to actuate the nuts of said unions.

17. In an automobile boat, a gear casing universally jointed beneath the stern of said boat at one end, a power plant including a driving shaft extending through the joint of said gear casing and having a universally jointed portion centrally thereof, a driving axle extending laterally through the gear casing, gearing operably connecting said shaft and axle, wheels on said driving axle, and springs supporting said wheels and the rear end of the gear casing.

18. In an automobile boat, a driving axle including a centrally disposed portion and lateral extensions therefrom, said extensions being held to rotate in unison with the central portion by a pin and socket connection, a gear casing having lateral tubular extensions bracing the central portion of the driving axle, a tubular axle casing extending from the tubular extensions and each having a collar abutting against their respective extension, a nut on each of the tubular casings threaded on to a respective tubular extension, a beveled gear formed on the outer face of each nut, and a nut wrench tube extending upward from a point immediately above each nut.

19. In an automobile boat, a hollow axle including a central gear casing, and tubular members detachably connected thereto, steering knuckles on the outer ends of said tubular members, a sectional shaft within said axle, gearing connecting said knuckles and shaft, and other gearing within said gear casing.

20. In an automobile boat, a hollow shaft including a central gear casing and tubular members detachably connected thereto, steering knuckles on the outer ends of said tubular members, a sectional shaft within said axle, gearing connecting said knuckles and shaft, other gearing within said gear casing, said other gearing including a worm gear on said shaft, a worm meshing therewith, a shaft for the last mentioned worm provided with a universal joint exterior of the casing, a hollow shaft within which the worm is slidably mounted, a sprocket on said hollow shaft, a steering post, and an operative connection between said post and sprocket.

21. In an automobile boat, a hollow front axle, a shaft within said axle, knuckles on the outer ends of said front axle, a segmental beveled gear carried by one of said knuckles and facing upwardly, a second segmental beveled gear carried by the other knuckle and facing downwardly, and toothed gears on said shaft meshing with the segmental gears.

22. An automobile having sectional axles, the sections of each axle being connected by nuts having their outer faces constituting beveled gears, and a wrench having a beveled gear on its end projecting downward through the automobile and engaging the beveled gear on the nut.

In testimony whereof I hereunto affix my signature in presence of two witnesses.

HARTLEY A. MITCHELL.

Witnesses:
C. S. GAWATH,
C. B. VOGEL.